United States Patent [19]

Valenta et al.

[11] Patent Number: 4,833,326
[45] Date of Patent: May 23, 1989

[54] LIQUID SCINTILLATION MEASUREMENT SYSTEM WITH ACTIVE GUARD SHIELD

[75] Inventors: Robert J. Valenta, Berkeley, Ill.; John E. Noakes, Athens, Ga.

[73] Assignee: Packard Instrument Company, Inc., Downers Groove, Ill.

[21] Appl. No.: 167,407

[22] Filed: Mar. 14, 1988

Related U.S. Application Data

[63] Continuation-in-part of Ser. No. 887,067, Jul. 17, 1986, abandoned, which is a continuation-in-part of Ser. No. 721,266, Apr. 8, 1985, Pat. No. 4,651,006.

[51] Int. Cl.$^4$ ............................................. G01T 1/178
[52] U.S. Cl. ................................... 250/362; 250/364; 250/366; 250/367; 250/369
[58] Field of Search .............. 250/367, 328, 366, 364, 250/369, 362, 361 C, 361 R

[56] References Cited

U.S. PATENT DOCUMENTS

| | | | |
|---|---|---|---|
| 3,842,278 | 10/1974 | Noakes | 250/369 |
| 3,898,460 | 8/1975 | Noakes et al. | 250/328 |
| 3,898,463 | 8/1975 | Noakes | 250/367 |
| 3,944,832 | 3/1976 | Kalish | 250/361 R |
| 4,049,966 | 9/1977 | Luitweiler, Jr. | 250/369 |
| 4,528,450 | 7/1985 | Valenta | 250/362 |
| 4,651,006 | 3/1987 | Valenta | 250/362 |

OTHER PUBLICATIONS

John E. Noakes and James D. Spaulding, "Pulse Shape Liquid Scintillation Counting for Beta, Gamma or Beta–Gamma Counting." in *Liquid Scintillation Counting, Recent Applications and Development, volume I Physical Effects* © 1980 Academic Press, Inc. pp. 105–117.

Y. Kalish, J. Sade, M. Oren and A. Simon, "An Automatic Computerizd Apha–Beta–Gamma Scintillation Spectrometer." *XIII International Conference on Medical & Biological Engineering: V International Conference on Medical Physics* Jerusalem, Isreal [ILX] (Aug. 19–24, 1979) 2 pages.

(Author Unknown) "The alpha–beta–gamma Scintillation Spectrometer." Advertising brochure published by BETA Engineering & Development, Ltd. of Beer--Sheva, Isreal [ILX] (Date unknown) 7 pages.

(List continued on next page.)

*Primary Examiner*—Janice A. Howell
*Assistant Examiner*—Constantine Hannaher
*Attorney, Agent, or Firm*—Stephen G. Rudisill

[57] ABSTRACT

A low-level liquid scintillation measurement system for counting sample optical events resulting from the radioactive decay of a constituent of a sample to be measured while reducing the counting of background optical events which are optical events produced by background radiation and which create electrical pulses other than pulses representing a sample optical event. This system includes detection means located adjacent the sample for detecting optical events and for converting optical events into electrical pulses, coincidence sensing means for receiving the electrical pulses from the detection means and producing a trigger pulse when the electrical pulses from the detection means coincide with each other, burst detection means for receiving the trigger pulses from the coincidence sensing means and the electrical pulses from the detection means for determining the number of electrical pulses present in a selected interval following each of the trigger pulses, evaluation means connected to the burst detection means for determining, in response to the number of pulses detected in the selected interval, the extent to which the optical event represented by the corresponding trigger pulse should be treated as a sample optical event or a background event, and an active guard shiled arrangement comprising an auxiliary scintillator optically coupled to the detection means. The shield is adapted to be excited by background radiation and to effectively increase the number of electrical pulses present in the selected interval following a trigger pulse generated as a result of the coincident pulses produced due to the background radiation. This allows the measurement system to accurately evaluate the number of pulses detected in the selected interval and determine the extent to which a trigger pulse is to be treated as a sample optical event.

43 Claims, 3 Drawing Sheets

OTHER PUBLICATIONS (Author unknown) "Model BSR-103 A, Automatic Computerized Alpha-Beta-Gamma Scintillation Spectrometer." Advertising letter by BETA Engineering & Development, Ltd. of Beer-Sheva, Isreal [ILX] (Feb. 25, 1980) 7 pages.

Robert Walraven and Yin Yeh, "Spurious Pulse Rejection in a Photon Correlation Experiment," *Review of Scientific Instruments,* vol. 50, No. 6 (Jun. 1979) pp. 780-786.

(Author unknown) "1220 Quantulus, A multi-parameter low level LSC system from LKB-Wallac." Advertisement from Wallac Oy, Turku, Finland [FIX] (Date unknown) 4 pages.

Disclosure Document No. 173,603, filed 7/13/87, Noakes, A Low Level Liquid Scintillation Counter Employing a Slow Rise Time Plastic Vial Holder and Pulse Shape Electronics.

LIQUID SCINTILLATION MEASUREMENT SYSTEM WITH ACTIVE GUARD SHIELD

RELATED CO-PENDING APPLICATION

This application is a continuation-in-part of application Ser. No. 06/887,067, filed July 17, 1986 now abandoned , which in turn is a continuation-in-part of application Ser. No. 06/721,266, filed Apr. 8, 1985, now U.S. Pat. No. 4,651,006, issued May 17, 1987.

BACKGROUND OF THE INVENTION

This invention generally relates to means for accurately measuring radiation emitted by radionuclides. More specifically, the present invention is directed to an improved liquid scintillation analyzer of the coincident pulse detection type which allows increased accuracy in low level liquid scintillation counting.

Liquid scintillation analyzers have become increasingly common in the accurate measurement of radiation activity in view of their relatively high counting efficiency, even for low energy radioisotopes such as tritium. Although a variety of . techniques are used, in its most basic form liquid scintillation analysis involves dissolving or suspending radionuclides in a solvent system capable of absorbing and transmitting energy originating from radioactive decay of a sample without attenuating that energy significantly. The solvent also contains a scintillator material and the combination of the sample, the solvent and the scintillator is commonly called a "scintillator cocktail." When radioactive decay occurs, it is followed by energy transfer from the radionuclide through the solvent system to the scintillator material in such a way that the scintillator material is activated and scintillates, thereby releasing light photons.

Early liquid scintillation analyzers were based on solitary photomultipliers for multiplying light signals resulting from scintillations within the cocktail with the photomultiplier output being amplified and analyzed by a suitable pulse analyzer. Such analyzers were susceptible to a variety of problems arising from inherent system noise as well as interfering radiation from external and internal sources leading to inaccurate measurements. This problem was solved t a certain extent by the advent of coincident pulse detecting liquid scintillation measurement systems which utilize a pair of photomultipliers aligned along a common axis with the radioactive sample being placed in between the two photomultipliers An electrical pulse arising as a result of the presence of radioactive emission from within the sample is considered to be the result of a legitimate radioactive event only if corresponding pulses from each of the photomultiplier tubes arrive at a coincidence detector within a predefined resolving time interval. By requiring the coincidental registration of radioactive events such liquid scintillation analyzers provide reasonable accuracy of measurement by minimizing the degrading effects arising due to the internal noise generated from within the system.

Such conventional measurement systems provide a certain degree of discrimination against some background events, particularly those due to internal system noise. However, they are critically affected by the existence of background radiation activity which may be generated by a variety of factors including Cerenkov radiation, environmental radiation, cosmic rays, static electricity, chemiluminescence, residual radioactivity of the vial or container for the scintillation cocktail and the glass used in the photomultiplier tubes and other proximate components. Radiation from these sources produces scintillations within the scintillation cocktail, sample vial or photomultiplier tube glass which become confused with, and are recorded as, valid cocktail scintillations resulting from actual radioactive decay of the sample. Protection against the effects of external radiation on such measurement systems is accomplished by the provision of a large mass of shielding material, usually lead, to form a radiation guard surrounding the liquid sample. This passive shielding, however, is not totally perfect in preventing external radiation from penetrating the system and may contain its own interfering radiation in the form of contaminants. Additionally, lead shielding is ineffective against contaminating radiation in components that are contained within the shield, such as the sample vial and the photomultiplier tubes.

Additional reduction of the effects of background radiation in liquid scintillation measurements has been accomplished by the use of guard systems employing scintillation materials, additional photodetectors sensing scintillations within the guard scintillator and a set of electronic circuits operating in anti-coincidence with the sample measurement circuitry.

Such systems, although very good at sensing and eliminating erroneous background radiation, are extremely expensive, bulky and inconvenient. As with lead shielding, they are only partially effective in eliminating the effects of background radiation from contaminants within the shielded area.

Subsequent improvements in liquid scintillation measurements have involved the use of a solid scintillation material as a guard and anti-coincidence arrangements with the coincident pulse detectors that are used by the system to detect sample scintillations also being used to detect scintillations in the guard scintillator. These systems include timing discrimination means capable of distinguishing between the fast decay times of scintillations from the liquid scintillatrr caused by radioactive events from within the test samples and those scintillations which are induced in the guard scintillator as a result of background radioactivity and have slower decay times. Although the accuracy of measurement is improved, such measuring systems are still susceptible to the effects of background radioactivity, particularly in the measurement of radioactivity levels of materials, such as tritium, which have relatively low energy emission levels, making them less easily distinguishable from the various background radiation sources.

The parent application Ser. No. 06/721,266, now U.S. Pat. No. 4,651,006, discloses a system which provides improved discrimination between background pulses and those pulses generated by true radioactive events in the sample, thereby improving the efficiency and accuracy of measurement by the use of liquid scintillation analyzers. The system utilizes certain of the inherent characteristics of the pulses being detected in order to ascertain whether they are valid sample pulses generated by sample optical events which are pulse-producing events resulting from the radioactive decay of the sample to be measured or invalid background pulses which are pulses generated by anything other than a sample optical event. This includes background optical events and electrical noise. The main sources of background optical events are scintillations of the sample vial or a photomultiplier tube glass caused by internal contaminating radiation contained within the detection system and its associated shield materials, as well as external radiation that has penetrated the system shield. The background discrimination technique is based on the premise that most background pulses triggering the coincidence detectors of the pulse detection systems have a series of randomly spaced pulses (a characteristic pulse burst) of relatively smaller energy levels and of approximate single photoelectron amplitude immediately following a coincident pulse.

In the system described in the aforementioned parent application, a particular coincident pulse is assumed to have been generated as a result of background scintillation and is disregarded in the determination of the overall energy spectrum of the radioactive sample being tested, if tracking of the output of the photomultiplier tubes for a predetermined period of time after the detection of the coincident pulse reveals that the characteristic burst of low energy pulses has occurred. The number of pulses detected in the pulse burst (the burst count) following a coincident pulse within a predetermined time period (approximately 5 microseconds) is utilized directly to determine whether or not the coincidence pulse is to be counted. Alternatively, the burst count is used in conjunction with the energy level of the coincident pulse to calculate the probability that the detected coincident pulse is the result of a valid sample scintillation.

The above type of burst detection technique provides more accurate measurements as compared to conventional liquid scintillation systems by generally improving discrimination between background and valid sample pulses. However, if the number of pulses existing in a characteristic pulse burst produced by an invalid background event is very small, the threshold number of pulses that must be detected within the predetermined time period following a coincident pulse in order to signify an invalid optical event is correspondingly small. In cases where the threshold number is extremely small, distinguishing between valid and invalid optical events is difficult because of the after-pulsing phenomenon in the photomultiplier tubes, which sometimes produces a small number of pulses following a valid optical event. There is, hence, an increased probability of misclassifying valid and invalid optical events.

This problem is of particular significance when the radionuclide under test has a low level of radioactivity so that the number of radioactive disintegrations and hence the valid count rate resulting from sample radioactivity is low enough to be comparable with the count-rate resulting from invalid background events. In such cases, even a few misclassifications can critically affect the sensitivity of measurement by significantly lowering the figure of merit for the measurement system, thereby increasing the probability that a background event will be falsely treated as a valid optical event.

The present invention ss aimed at solving this problem by adapting the burst-detection technique of the parent application in a manner that enhances the ability of liquid scintillation analyzers to accurately discriminate between pulses generated due to valid radioactive events and those generated by background radiation activity, especially in the case of extremely low-level radionuclides.

SUMMARY OF THE INVENTION

It is a primary object of the present invention to provide an improved liquid scintillation counter which is economical, less bulky and capable of determining the radioactive count rate for a radionuclide sample with increased reliability and accuracy without the need for an external guard shield and its associated detection system.

It is another object of the present invention to provide a technique and system for providing increased discrimination capability between sample scintillations and background scintillations.

It is a further object of the present invention to provide improved efficiency and accuracy of measurement and improved background discrimination capability for a liquid scintillation measurement system based upon the detection of a burst of pulses following a coincident pulse and the energy of the coincident pulse toward determining the extent to which a coincident pulse is to be attributed to valid sample scintillation.

Yet another object of this invention is to provide a technique and system of the above type which is particularly suited for use with samples having inherently low radioactivity levels.

A related object is to provide a system of the above kind which can be easily adapted to measure both beta and gamma types of radioactivity.

These and other objects are achieved, according to the system of this invention, by providing a liquid scintillation pulse discrimination system of the burst-counting type with an active radioactivity guard shield comprising an auxiliary scintillator located in the space between the two photodetectors for producing optical events in response to background radiation. The active guard shield is designed in such a way that radioactivity from the liquid scintillation sample contained within the auxiliary scintillator of the guard shield is prevented from interacting with the guard shield material. The auxiliary scintillator is easily excited by external, background radiation, and the resulting scintillations are optically coupled into the same photodetectors that are used to monitor the liquid scintillator sample.

The system of this invention provides a two-way discrimination capability between pulses generated by sample-initiated optical events and those generated by background-initiated optical events. More specifically, when invalid optical events are produced as a result of background activity, any resulting coincidence pulse is usually followed by the characteristic pulse burst which is detected by the system, whereas valid sample optical events are not followed by such a pulse burst. Desired adjustments are then made in the calculated overall energy spectrum for the monitored sample.

The presence of background sources of radiation, such as gamma radiation in the form of cosmic rays, excites the material of the vial which contains the liquid sample and the glass material of the photomultiplier tubes to produce characteristic pulse bursts. The background radiation also invariably excites the auxiliary scintillator material and produces a coincident pulse which is followed by a pulse burst; this burst, however, contains more pulses due to the greater scintillator efficiency and added volume of the auxiliary scintillator material Because the scintillation from the auxiliary scintillator are detected by the same photomultipliers that detect the other optical events initiated by background radiation, and at the same time, the pulses in the burst from the auxiliary scintillator are superimposed on the pulses from the other sources such as the vial and the glass of the photomultiplier tubes. Thus, the number of pulses in the detected burst is increased significantly by the pressure of the auxiliary scintillator. (The liquid scintillator containing the sample contributes very little to the trailing pulse burst, even though this scintillator too receives the background radiation, because almost all the light emitted by the sample scintillator has a fast decay rate).

The overall effect of the auxiliary scintillator, therefore, is to enhance or make more noticeable the characteristic pulse bursts generated by background radiation, thereby allowing the pulse bursts to be more accurately and more easily detected by the measurement system. This enhanced pulse burst permits the use of a higher burst count threshold value in order to distinguish easily between valid and invalid optical events, especially when the valid count rate is comparable to the background count rate. It is thus possible to ensure that most background optical events are accurately detected and subsequently discounted or given less weight in the pulse evaluation procedure.

The provision of the auxiliary scintillator material as an active radiation guard shield hence allows increased discrimination between pulses generated as a result of valid scintillations within the sample and those generated by external or internal background radiation activity, thereby providing the "burst-counting" based liquid scintillation measurement system with significantly increased efficiency and accuracy of measurement, especially when used with low-energy and low-activity radiation samples The measurement system is simple and convenient to use and does not require additional optical event detection means to realize the improved discrimination capability.

Other objects, characteristics and advantages of the present invention will be apparent from the following detailed description when taken in conjunction with the accompanying drawings.

DESCRIPTION OF THE PREFERRED EMBODIMENTS

While the invention will be described in connection with certain preferred embodiments, it will be understood that it is not intended to limit the invention to these particular embodiments. On the contrary, it is intended to cover all alternatives, modifications and equivalent arrangements as may be included within the spirit and scope of the invention as defined by the appended claims.

Figure 1:
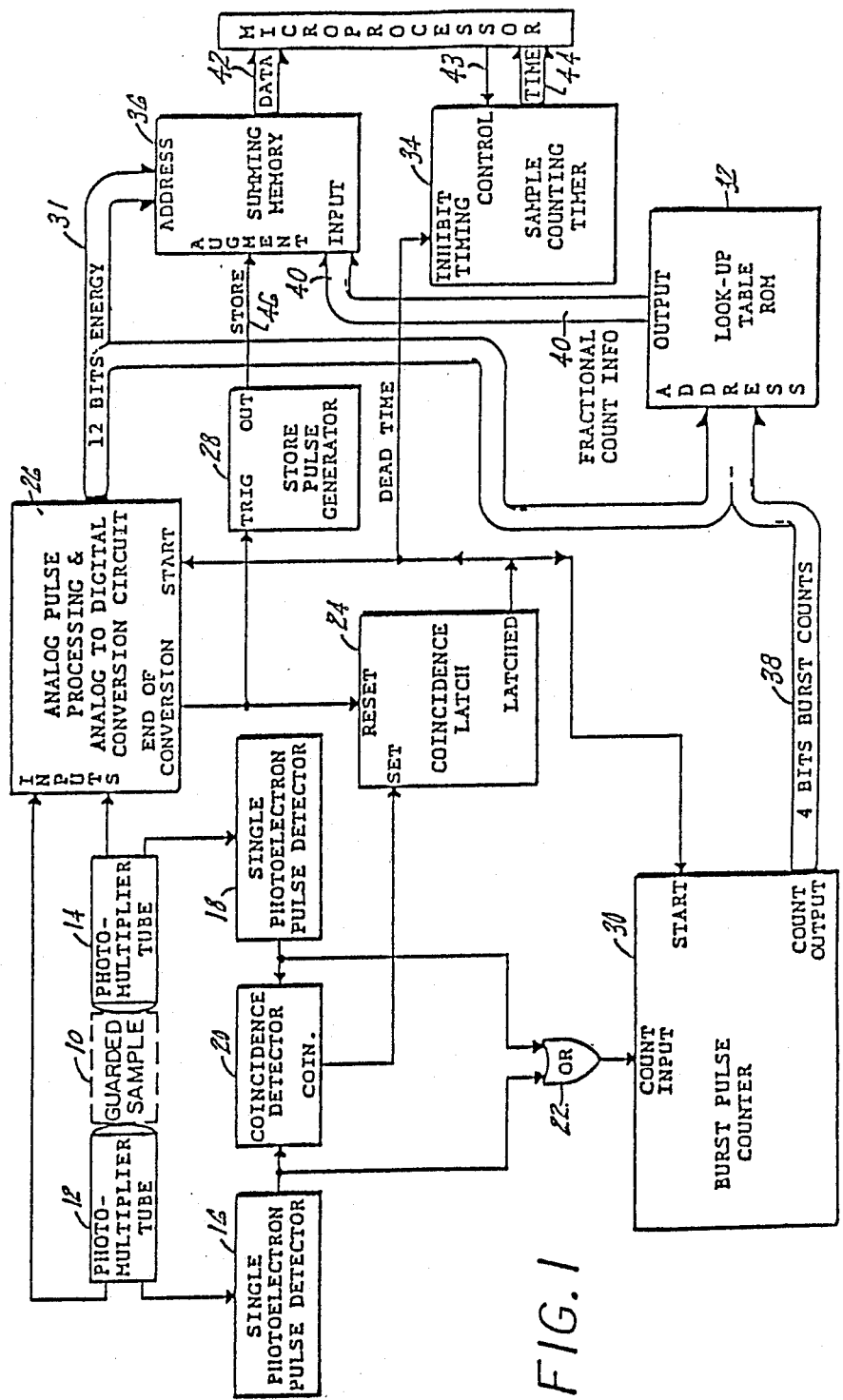
FIG. 1 is a simplified block diagram of a liquid scintillation measurement system of the coincidence detection type including means for detecting the pulse bursts characteristic of background radiation.

Referring now to FIG. 1, there is shown a block diagrammatic view of the improved "burst-counting" type liquid scintillation measurement system according to this invention.

In FIG. 1, the guarded liquid scintillation cocktail unit 10 containing the sample to be tested, is mounted in a shielded area wherein photomultiplier tubes 12 and 14 may be utilized to detect optical events. For purposes of clarity, the measurement system represented in FIG. 1 will be initially described without accounting for the effect of the active guard shield surrounding the sample, and the structural arrangement and function of the guard shield will then be described in detail with reference to FIGS. 2-6. As the radionuclide in the scintillation cocktail decays, beta particles are emitted within the guarded unit 10 and act to energize a scintillating fluor within the cocktail. The fluor converts the energy from the beta particles into light photons which are detected by the photomultiplier tubes 12 and 14. The photomultiplier tubes generate an analog electrical pulse representative of the energy level of the detected event, and their outputs are sensed and transformed to a digital format by a pair of single photoelectron pulse detectors 16 and 18, which are essentially amplitude comparators operating with an appropriate reference voltage.

The digital pulses emitted by the single photoelectron pulse detectors 16 and 18 are called "singles" pulses and are directed to a coincidence detector 20 and to an OR gate 22 and represent the fact that an analog pulse of at least a single photoelectron amplitude has been detected. The coincidence detector 20 indicates when a singles pulse occurs substantially simultaneously at both photomultiplier tubes and in response thereto transmits a coincidence signal to a coincidence latch 24. The coincidence signal acts to trigger the sequence of steps necessary to analyze, convert and store data representing the initiating optical event. The OR gate 22 acts to sum the two singles pulses received from the single photoelectron pulse detectors 16 and 18 and delivers that signal as a count input to a burst pulse counter 30. This signal is called the "summed singles" signal.

Each of the photomultiplier tubes 12 and 14 is also connected to an analog pulse-processing and analog-to-digital conversion circuit 26. This circuit acts to shape the appropriate analog pulses and to provide a distal output signal indicative of the energy level of a particular pulse. This output signal, typically a 12-bit signal, is carried over a bus 31 which extends from the circuit 26 to a look-up-table ROM 32 and a summing memory 36.

The burst pulse counter 30 is likewise connected with a 4-bit data bus 38, to deliver burst counts to the look-up-table ROM 32. The ROM 32 contains a table of probabilities based on both the number of burst counts following a coincidence pulse within a predetermined time window, which is supplied over bus 38, and the energy level of the pulse, which is supplied over bus 31.

From these two inputs, a probability factor is determined from the ROM 32 and conveyed over a bus 40 to summing memory 36. The pulse value of 1 is multiplied by the probability that it is a valid sample pulse (as opposed to an invalid background pulse) and is summed in the memory 36. This information is then provided over a data bus 42 to the microprocessor associated with the liquid scintillation counter as is known in the art.

Functions other than probabilities may be used to indicate the validity of the counting process. Moreover, multiple look-up tables could be used depending on the efficiency levels desired and the $E^2/B$ ratios.

The coincidence detector 20 additionally provides a coincidence signal to the coincidence latch 24. This signal acts to set the coincidence latch. Once coincidence is detected, and if the latch is not currently latched indicating a busy condition, a latch signal is generated by the coincidence latch 24. This latch signal is disseminated to the burst pulse counter 30 to effect starting of the time interval after the coincidence pulse during which the burst pulse counter will count pulses. A signal is also delivered to the analog pulse-processing, analog-to-digital conversion circuit 26 to commence operation of that circuit relative to the coincidence pulse, and to a sample-counting timer 34 to indicate to that circuit that the sample counting timing is inhibited. The sample counting timer 34 is started, stopped, and reset by a control signal from the microprocessor through a signal path 43, and the sample counting time is provided to the microprocessor through a bus 44.

The analog pulse-processing, analog-to-digital conversion circuit 26 also provides an indication of the end of the conversion process for a particular pulse through a connection to the coincidence latch 24 in order to effect resetting of the coincidence latch after the pulse has been processed and converted this signal is connected to a store pulse generator 28 to trigger the store pulse generator to have the summing memory add a particular pulse of fractional count value supplied by the bus 40 to its memory. The output signal 46 of the store pulse generator 28 is connected to the summing memory 36.

When both photomultiplier tubes 12 and 14 generate the appropriate pulses indicating that a sample pulse has been detected and the coincidence detector detects that said pulses have occurred at the same time, then an appropriate signal is supplied to the coincidence latch 24 to provide a latch signal. In the interim all pulses detected by the photomultiplier tubes, both valid sample pulses and scintillations from the guarded sample or the photomultiplier tube glass or electrical noise, are passed on by the photomultiplier tubes to the single photoelectron pulse detectors 16 and 18 and therefrom through the OR gate 22 to the burst pulse counter 30. Once coincidence detector 20 detects coincident pulses, the resulting coincidence signal acts to set the coincidence latch 24 which then starts the time interval for the burst pulse counter 30. It is during this time interval that the number of pulses following the coincidence pulse is detected, and it is this number that is supplied to the look-up table ROM via the data bus 38. The burst pulse counter 30 is designed to have a time interval built therein such that the length of the time window during which pulses are counted is known and is on the order of 1 to 9 microseconds.

The coincidence latch 24, in addition to generating a latch signal, also acts to start the analog pulse-processing and analog-to-digital conversion circuit 26. The circuit 26 acts to generate a 12-bit digital signal indicative of the energy level of the pulse received from the photomultiplier tubes 12 and 14. Once the process of converting the signal to a 12-bit digital signal is completed, an end-of-conversion signal is sent to reset the coincidence latch and to trigger the store-pulse generator.

The energy level of the pulse from the analog pulse-processing and analog-to-digital conversion circuit 26 is conveyed over the data bus 31 and the burst count is conveyed over the data bus 38. Both numbers are conveyed to the look-up-table ROM 32 and are utilized to determine the probability that the event indicated by the coincidence detector to be a coincident pulse is a actual sample event to be utilized in determining the spectra of the radioactive decay of the radionuclide within the sample. As the number of burst counts in the time interval following the coincidence pulse increases, the probability that the coincident pulse is a valid sample pulse decreases. Additionally, this probability varies with the overall energy level of the coincident pulse. Hence, the look-up table concerns itself with both the number of burst counts in the time interval and the energy level of the coincident pulse From these two factors the probability that it is a valid sample pulse is determined. This probability value in theory is assigned a number between zero and 1, and this value is supplied to the summing memory 36.

The end-of-conversion signal from the analog pulse-processing and analog-to-digital conversion circuit 26 is received by the store-pulse generator 28 as a trigger signal. In response to the trigger signal, the output 46 from the store-pulse generator 28 causes the summing memory 36 to add a count at the given energy level to the register summing counts of that level or to add a count or fraction thereof at a specific energy level depending upon the specific pulse. Fractional count information is provided over the bus 40 from the look-up-table ROM 32. Hence, the summing memory multiplies a count value of 1 times the fractional count information, which is the probability that it is a valid sample, and enters that value in its memory. For instance, if the theoretical probability is 0.7 that a pulse is a valid sample pulse, then the summing memory will identify the appropriate energy level and a number of 0.7 will be added to the other numbers at that energy level to indicate the total number of counts for that particular energy level for the sample being monitored.

The burst pulse counter is a combination of a gated counter and a timer. The counter is originally set to zero and the start pulse starts the timer. The timer enables the counting gate and permits summed singles, received from the OR gate 22, to be counted. (Note that the singles involved in generating the coincidence pulses are not counted.) The counting of summed signals (burst counts) continues until the timer times out (approximately 5 microseconds later) and the counting gate is disabled. The counted value is then held in the counter and on the bus 38 until the fractional count information on bus 40 is stored in the memory 36.

The single-photoelectron pulse detector is a voltage threshold detector that outputs a digital pulse of fixed width in the area of 30–100 nanoseconds when its analog input amplitude exceeds an amplitude corresponding to a suitable level for detecting a single-photoelectron pulse from the photomultiplier tube. It is able to detect input pulses as short as 2 nanoseconds. This detector has a dead time of about 30-100 nanoseconds each time it receives a pulse from the corresponding photomultiplier tube.

The remainder of the components are basically known components which may be assembled in the manner described and perform the function as designed. The microprocessor is equivalent to the microprocessors incorporated in the current product offering of the liquid scintillation counter manufacturers.

The system described so far is capable of discriminating fairly accurately between coincident pulses generated as a result of actual radioactive emission from the radionuclide within the liquid scintillation sample and those pulses generated due to spurious background events on the basis of the characteristic pulse bursts which follow the spurious events. However, when the pulse burst characteristically produced by invalid background events has a small number of pulses, identifying an invalid background event accurately becomes a problem because of the confusion arising due to the occasional existence of a very small pulse burst following some valid optical events as a result of after-pulsing of the photomultiplier tubes. Discriminating between sample-initiated optical events and background-initiated optical events also becomes more important when the sample has a low level of radioactivity, so that the background radiation becomes a substantial part of the total radiation being detected. In cases like these, the use of an active guard shield, as described below, significantly improves the accuracy of the detection system.

Figure 2:
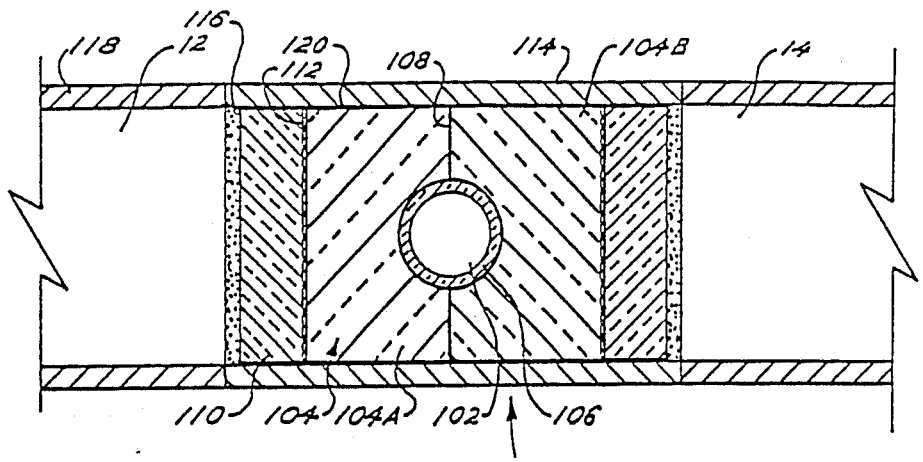
FIG. 2 is an illustration of the structural details involved in encasing the liquid scintillation sample with an active guard shield for use with the measurement system of FIG. 1.

In FIG. 2, the guard shield arrangement includes a counting chamber 100 comprising a vial 102 which is surrounded by a solid auxiliary scintillator 104. The auxiliary scintillator 104 is preferably constructed of two bonded segments, 104A and 104B, of the desired solid scintillation material in a cylindrical configuration which has central hole formed therein to allow the liquid scintillation vial 102 to be centrally placed within it. The scintillation vial 102 which contains the sample is generally of a transparent material, such as borosilicate glass, commonly used for containing liquid samples. Since the radioactivity of the sample is of the beta type, it is incapable of penetrating the solid material of the glass vial and is prevented from exciting the auxiliary scintillator 104. The auxiliary scintillator 104 can hence be excited only by external background radiation. A quartz sleeve 106 surrounds the scintillation vial 102 and serves as an optical window for allowing photons originating in the liquid sample contained within the scintillation vial 102 to be coupled to th photomultiplier tubes 12 and 14 of FIG. 1. In addition, the sleeve 106 provides protection for the inner surface of the auxiliary scintillator material.

In order to prevent any optical crosstalk between the photomultiplier tubes 12 and 14, a layer of reflective material 108 is provided between the mating surfaces of the bonded scintillator segments 104A and 104B. The reflective material prevents scintillations produced in either one of the bonded segments from exciting a response from the photodetector corresponding to the other of the bonded segments.

Each of the bonded segments 104A and 104B is attached to a quartz window 110 through a layer of light permeable optical epoxy glue 112. The structure formed by the bonded segments and the quartz windows is encased in a metallic housing 114 made of a dense material, such as brass, having low radioactive contaminant levels so that the housing itself does not contribute to background radiation. The solid scintillator material of the counting chamber 100 is optically coupled to the faces of the photomultiplier tubes 12 and 14, via a layer of suitable optical material 116 such as silicone grease placed between the quartz window 110 and the active surfaces of the photomultiplier tubes 12 and 14 A similar layer (not shown) is used to optically couple the quartz sleeve 106 to the scintillator 104. Each of the photomultiplier tubes is encased in a metallic housing 118 so that coupling of the tubes to the quartz window 110 of the counting chamber 100 results in a light-tight structure.

In order to ensure that a majority of scintillations generated from within the liquid scintillaiion sample as well as the surrounding solid scintillator reach the respective faces of the two photomultiplier tubes 12 and 14, a coating 120 of reflecting powder, paint vacuum-deposited or aluminum is provided on all outer surfaces of the scintillator 104 except at places where optical transmission is necessary, such as the interfaces with the quartz sleeve 106 and with the faces of the photomultiplier tubes.

The above arrangement allows convenient assembly and disassembly of the counting chamber and the photomultiplier tubes. The provision of the quartz window serves as a permanent means for protecting the auxiliary scintillator and allows the counting chamber to be conveniently decoupled from th photomultiplier tubes (when the tubes have to be replaced or for any other reason) and reassembled without affecting the solid scintillator in any way.

The function of such a detector, which includes the liquid scintillation sample vial surrounded by a solid scintillator, in enhancing the operation of the measuring system of FIG. 1 will now be described.

External radiation, such as cosmic rays, strikes the glass material of the scintillatin vial as well as the glass of the photomultiplier tubes and produces scintillations which constitute invalid optical events. Because the material of the vial and the photomultiplier tubes is conventionally chosen to be of low scintillation capacity, characteristic pulse bursts following such invalid events are likely to contain a small number of pulses. This requires a lower burst count discrimination threshold and, as discussed above, increases the probability of erroneous discrimination between valid and invalid optical events which seriously affects the accuracy of measurement in the case of low-level scintillation counting applications.

The provision of the active guard shield enhances the accuracy of the burst counting measurement system in such applications. The auxiliary scintillator material of the guard shield is selected to be easily excited by external radiation and hence produces a burst of photons over a time period that is long in comparison to the length of time over which the scintillation cocktail emits photons. In addition, the auxiliary scintillator is chosen to be a fairly efficient transmitter of light so that most of the light from the scintillation cocktail is coupled directly to the photomultiplier tubes. The auxiliary scintillator also must contain a very low amount of radioactive contaminants so that no significant background radioactivity is generated by the auxiliary scintillator itself.

When cosmic rays strike the auxiliary scintillator 104, it scintillates and produces corresponding electrical signals within the photomultiplier tubes 12 and 14. The subsequent operation of the rest of the measurement system is identical to the description provided in the case of FIG. 1. The significance, however, is that when the auxiliary scintillator 104 is excited by external radiation such as gamma rays, it produces a characteristic pulse burst (following a detected coincident pulse) which includes an increased number of pulses as compared to the characteristic pulse burst normally resulting from the external excitation of the glass material of the scintillation vial and the photomultiplier tubes.

It will be noted that external radiation may produce background scintillations from both the auxiliary scintillator and the sample vial since a background gamma ray may pass through both the vial and the auxiliary scintillator depending upon its direction. These two background scintillation effects are inherently coincidental in nature, and because of mutual optical coupling (FIG. 2), the strong characteristic pulse burst from the solid scintillator is superimposed onto the relatively weaker characteristic pulse burst from the material of the via and the photomultiplier tubes. The "weak" pulse burst normally resulting from background radiation excitation is thus augmented by the corresponding "strong" pulse burst resulting from background radiation excitation of the solid scintillator, thereby making the characteristic pulse bursts more noticeable (i.e., increased number of pulses within a selected time interval following a coincident pulse) so that the burst count discrimination threshold can be raised to a higher count. This higher threshold level results in a decreased probability of erroneous discrimination between valid and invalid optical events, resulting in a higher counting efficiency and a reduced background.

Even if the scintillation vial and photomultiplier tube glasses have weak photon emission properties, the presence of the guard shield results in stronger characteristic pulse bursts as a result of background radiation and consequently improved discrimination and accuracy of measurement, especially for cases where count rates for valid and invalid optical events are of the same order of magnitude in the absence of the guard shield. The net result is that even though a valid sample optical event has the possibility of occasionally being followed by burst pulses due to photomultiplier tube after-pulsing, a significantly reduced number of valid optical events are misclassified by the detection system as invalid optical events an vice-versa because of the increased burst count threshold. This directly increases the figure of merit for the measurement system, which is defined as $E^2/B$, where E is the ratio of the number of detected disintegrations to the total number of disintegrations and B is the number of detected background events in the absence of sample radioactivity, since the number of detected valid events is increased (resulting in a higher value for E), while the number of background events (B) is decreased.

It will be understood that the presence of the auxiliary scintillation material aids in the measurement process because the illustrative measurement system is capable of rejecting coincident pulses generated by background radiation on the basis of the burst-counting technique described above with reference to FIG. 1. That is, the combination of the active guard shield with the burst-counting discrimination technique produces a substantial increase in accuracy of liquid scintillation measurement.

Although the burst counting technique described above is strongly preferred for the pulse shape discrimination system employed in this invention, other pulse shape discrimination techniques may be employed where less accurate results are acceptable. The results produced by these alternative systems may still be improved significantly by using them in combination with the slow auxiliary scintillators described below. Examples of such alternative pulse shape discrimination systems are described in the literature, such as *Radiation Detection and Measurement,* by G. F. Knoll, John Wiley and Sons, Inc., 1979.

The light emission from a "slow" scintillator is generally represented by one or more exponential decays. The faster decays are referred to as the "main components" of the light emission, and are usually characterized by their "decay constants" (the time required for the intensity of the light emission of each individual component to be reduced to 50% of its peak value) expressed in nanoseconds. Some scintillators have a slowly decaying component with a decay constant that is several orders of magnitude slower than the faster components. This slowest decay is referred to as the "afterglow", and is usually characterized by the percentage of the peak light intensity remaining after a prescribed time interval expressed in microseconds or milliseconds.

The decay constant of the main component of the light emission from a liquid scintillator for measuring beta radiation is preferably a small fraction of the dead time of the single-photodetector-pulse detectors 16 and 18. For example, when the dead time of the detectors is 80 nanoseconds, the sample scintillator typically has a main-component decay constant of less than 5 nanoseconds. Slower decay components of the liquid-scintillator light emissions which would be confused with the slower emission from the auxiliary scintillator are removed by allowing the presence of a small amount of oxygen in the liquid scintillation cocktail.

The auxiliary scintillator 104 has a main-component decay constant much longer than that of the sample scintillator, and also much longer than the dead time of the single-photoelectron-pulse detectors 16 and 18. In general, the probability that detected coincident pulses originated from a background event increases as the number of pulses in the burst-detection interval increases. Consequently, it is desirable to detect as many as possible of the pulses occurring within this interval, which in turn means it is desirable for the auxiliary scintillator to continue to emit light throughout a substantial portion of the burst-detection interval. For example, when the burst detection interval is 5 microseconds, it is preferred that the auxiliary scintillator have a main-component decay constant of at least 250 nanoseconds. In order to prevent the auxiliary scintillator from interfering with the evaluation of the next coincident-pulse detection, the afterglow of the auxiliary scintillator should be at a statistically insignificant level at the end of the coincident-pulse-evaluation interval.

Examples of preferred slow fluors for the auxiliary scintillator are crystalline ring-structured compounds such as pyrene, naphthalene, phenanthrene, anthracene, carbazole, azulene, chrysene, perylene, 2-ethyl anthracene, and 2-ethyl napthalene. These fluors may be used by themselves, or dissolved in solid polymers. For example, the fluor may be dissolved in an organic liquid monomer; purged of oxygen gas; and then polymerized by heat or activators to produce a solid polymer such as polyvinyl toluene, styrene or polymethylmethacrylate containing the fluor. Other suitable slow fluors are glass scintillators, such as those described in "Glass Scintillators for the Detection of Nuclear Radiation," D. G.

Anderson et al., Proceedings of the Fifth International Instruments and Measurements Conference, *Instruments and Measurements,* Academic Press, September, 1960; epoxy resins; aromatic expoxies; phenyl silicones; aromatic polyesters; and aromatic polyurethanes. The auxiliary scintillator need not be a solid, e.g., liquid slow fluors may be used by containing them within one or more hollow transparent members having the desired configuration.

If desired, a wave shifter may also be dissolved in the polymer to convert the wavelength of the light emitted by the primary fluor to a wavelength that is within the optimum detection band of the photomultiplier tubes. The use of wave shifters in scintillators for radiation counting is well known.

As will be described in more detail below, particularly good results have been obtained with polyvinyltoluene (PVT) containing pyrene as the primary fluor and 9, 10-diphenylanthracene (DPA) as a wave shifter. The PVT-pyrene-DPA polymer can be easily machined to form the guard-shield configurations described above, or any of the alternative configurations described below.

Figure 3:
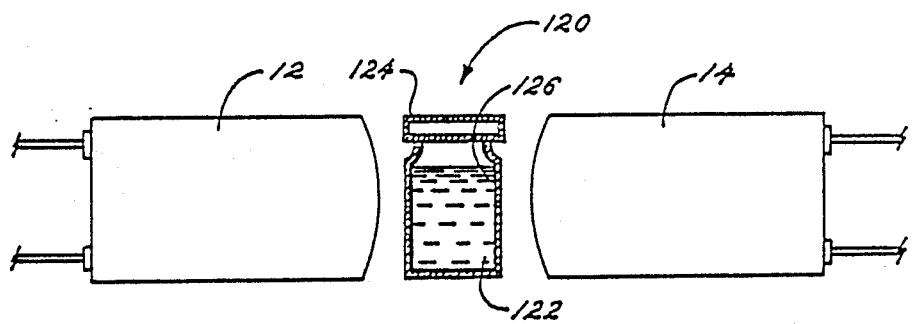
FIG. 3 is a diagrammatic illustration of an alternative arrangement for providing an active guard shield around the liquid sample.

Referring now to FIG. 3, there is shown an alternate and structurally uncomplicated configuration of an active guard shield arrangement that can be used in conjunction with the liquid scintillation measurement system of FIG. 1 and/or the auxiliary scintillator materials described above. This arrangement dispenses with the need for the active guard shield to be constructed with the two photomultiplier tubes as the discretely structured unit shown in FIG. 2. In the embodiment of FIG. 3, the liquid scintillation vial 120 itself forms the active guard shield for the liquid scintillation cocktail !22 contained within the vial. More specifically, the vial 120 is composed of the auxiliary scintillator material, and is positioned within the operating range of the two photomultiplier tubes 12 and 14 which form the optical event detection means in the liquid scintillation measurement system of FIG. 1. The preferred auxiliary scintillator materials described above may be used to construct the liquid scintillation vial 120.

The liquid scintillation vial 120 is provided with an Optically transparent electron impressive coating 126 on its inside surface in order to prevent the radioactivity emitted by the liquid sample from exciting the solid scintillator material of the vial. More specifically, the coating 126 prevents the beta radiation from the liquid sample from striking the solid scintillator material of the vial. However, background radiation, such as cosmic rays which essentially consist of gamma radiation, has substantially greater penetration capability and easily passes through the scintillation vial 120 and the electron impermissive coating 126 to strike the liquid scintillation cocktail 122 contained within the vial 120. Conventional external reflector means (not shown) is preferably provided around the scintillation vial in order to contain and direct scintillations from the vial toward the photomultiplier tubes.

The principle of operation of the guard-shield configuration of FIG. 3 is essentially the same as that described above with respect to FIG. 2. Both valid events due to sample radiation and invalid events due to undesired background external radiation such as cosmic rays produces scintillations in the liquid scintillator 122. In the case of invalid events, a resultant coincident pulse detected by the photomultiplier tubes 12 and 14 is followed by the pulse burst characteristic of background radiation, which the measurement system of FIG. 1 is capable of detecting. The auxiliary scintillator material of the liquid scintillation vial 120 acts as an active guard shield and is also excited by any external radiation and, at substantially the same time, produces scintillations which result in coincident pulses which are followed by a pulse burst characteristic of the auxiliary scintillator material. This results in a characteristic pulse burst that is enhanced by virtue of an increased number of pulses, and which may be more easily and accurately used by the measurement system of FIG. 1 to accurately distinguish between valid and invalid optical events.

Figure 4:
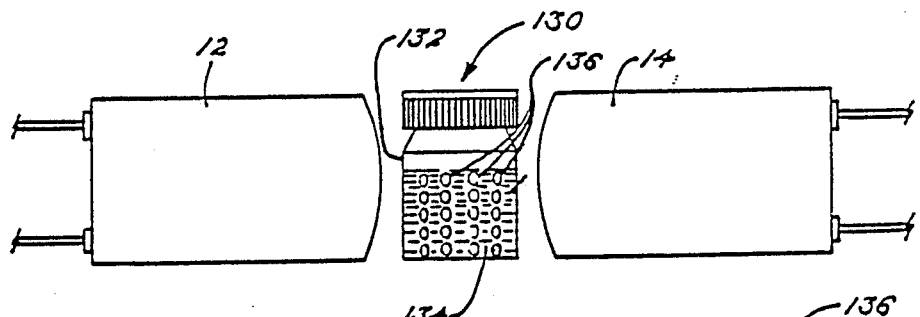
FIG. 4 is an illustration of a third arrangement of the active guard shield for use with the measurement system of FIG. 1.
Figure 4A:
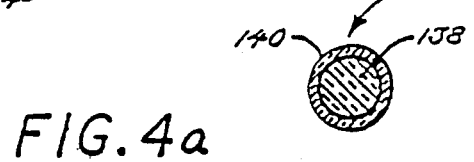
FIG. 4a is an enlarged cross-sectional view of a typical solid scintillator bead for use with the embodiment of FIG. 4.

FIG. 4 shows another configuration of an active guard shield arrangement for use in conjunction with the liquid scintillation measurement system of FIG. 1. In the embodiment of FIG. 4, the liquid scintillation vial 13 is of a standard low scintillation capacity material 132, such as conventionally used in liquid scintillation measurement systems. The active guard shield for the liquid scintillation cocktail 134 in this case is provided within the scintillation cocktail itself in the form of a multiplicity of small beads 136 made of a suitable auxiliary scintillator material. Each of the beads 136 consists of a central core of solid scintillator material 138 which is provided With an optically transparent outer coating 140 of a suitable electron impermissive material, as shown in the enlarged view of FIG. 4A. The auxiliary scintillator material of the beads 136 is preferably an efficient transmitter of light, since no light need actually pass through the scintillator beads. The beads 136 are mixed into and held in suspension by the solvent contained in the liquid scintillation cocktail 134. The outer coating 140 of the beads 136 prevents the charged-electron beta radiation from the radioactive sample in the cocktail from penetrating through to strike the auxiliary scintillator material 138. External gamma radiation, on the other hand, easily penetrates the scintillation vial 132, the scintillation cocktail 134 and the coating 140 of the beads 13 to strike and produce scintillations within the auxiliary scintillator material of the beads. The embodiment of FIG. is also preferably provided with conventional reflector means (not shown) disposed externally around the scintillation vial to direct light scintillations from the vial to the photomultiplier tubes.

As in the embodiments discussed with reference to FIGS. 2 and 3, the beads of auxiliary scintillator material act as an active guard shield which is responsive to external radioactivity and effectively produces an enhanced characteristic pulse burst in the presence of external radiation. It will be apparent to those skilled in the art that the liquid scintillation cocktail may also be formed as a gelled mixture of the cocktail with ground up or crushed auxiliary scintillator material which promotes suspension of the auxiliary scintillator material in order to realize the active guard shield effect.

Figure 5:
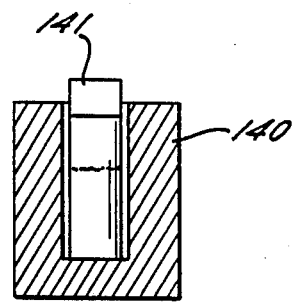
FIG. 5 is a vertical section of a fourth arrangement of the active guard shield for use with the measurement system of FIG. 1.

FIG. 5 illustrates an embodiment in which the auxiliary scintillator takes the form of a vial holder 140 for receiving a sample vial 141. This vial holder 140 is similar to the guard shield 104 of FIG. 2, except that the vial holder 140 is removable from the counting chamber. Commercial liquid scintillation spectrometers are conventionally used with two different sizes of vials. Thus, the outside dimensions of the vial holder 140 are preferably the same as the dimensions of the larger of the two conventional vials, while the inside dimensions of the vial holder 140 are slightly larger than those of the smaller conventional vial; these dimensions permit conventional small vial 141 to be received in the vial holder 140, which in turn is readily accomodated by a standard liquid scintillation spectrometer because it is of the same size as a standard large vial.

Figure 6:
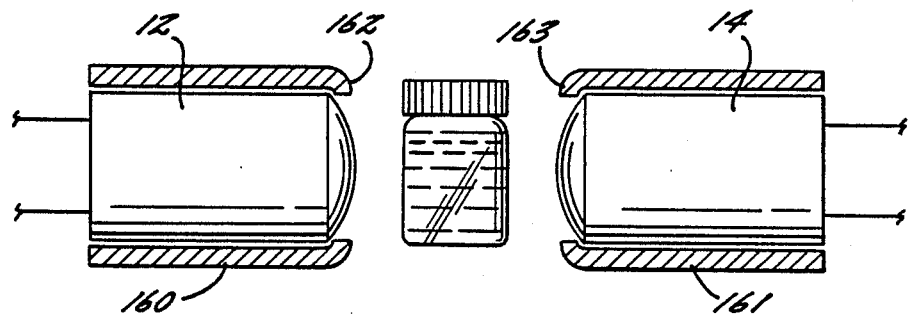
FIG. 6 is a vertical section of a sixth arrangement of the active guard shield for use with the measurement system of FIG. 1.

Another modified embodiment of the active guard shield is illustrated in FIG. 6. In this embodiment, the auxiliary scintillator is in the form of a pair of cylindrical sleeves 160 and 161 surrounding the photomultiplier tubes 12 and 14, respectively. The ends of the sleeves 160 and 161 adjacent the faces of the photomultiplier tubes form inwardly extending lips 162 and 163, respectively. All surfaces of the sleeves 160 and 161, except the innermost surfaces of the lips 162 and 163, are silvered so that the sleeves function as light pipes to guide light from scintillations occurring therein to the photocathodes of the repetitive photomultiplier tubes. This configuration of the guard shield is preferably used in combination with one or more of the configurations of FIGS. 2-5. Indeed, the configurations of FIGS. 2-5 may be used in combination with each other.

EXAMPLE

A series of comparative tests were conducted with a commercial Packard 2000 Liquid Scintillation Counter to compare the results obtained with (1) no guard shield, and (2) a guard shield of pyrene and 9, 10-diphenylanthrocene (DPA) in a vinyl toluene polymer. In each of these two cases, a standard $^3H$ sample and a standard $^{14}C$ sample were measured, and each sample was measured in each of the following four modes of the counter:

ROM out—no burst counting discrimination
Nnormal Count Mode (NCM) minimum burst counting discrimination
High Sensitivity Count Mode (Hi Sens)—intermediate burst counting discrimination
Low Level Count Mode (LLCM)—maximum burst counting discrimination The pyrene-DPA-vinyl toluene guard shield was prepared by dissolving pyrene and 9, 10-DPA in distilled inhibitor-free vinyl toluene monomer at concentration levels of 6 grams/liter and 0.3 grams/liter, respectively. The solution was purged of dissolved oxygen by passing nitrogen gas through the solution, and then polymerized by heating. The resulting polymer was formed into a cylindrical vial holder having a central well for receiving a standard 7-ml. vial. The vial holder was 1.9 inches long with an outside diameter of 1.05 inches, an inside diameter of 0.7 inch, and a base thickness of 0.1 inch.

In a first series of tests, the $^3H$ sample was a 5-ml. cocktail of toluene containing 0.02 gram PPO, 0.00125 gram dimethyl POPOP, and tritiated toluene of 100,000 to 120,000 DPM. The $^{14}C$ sample was a 5-ml. cocktail of toluene containing 0.02 gram PPO, 0.00125 POPOP gram, and carbon-14 toluene of 80,000 to 95,000 DPM. Each sample was measured in a standard 7-ml. glass vial.

The results of the test are set forth in the following table:

| SAMPLE | MODE | WITHOUT VIAL HOLDER | | | | WITH VIAL HOLDER | | | |
|---|---|---|---|---|---|---|---|---|---|
| | | CPM | Efficiency % | BKG CPM | $E^2/B$ | CPM | Efficiency % | BKG CPM | $E^2/B$ |
| $^3H$ | ROM OUT | 85406.4 | 61.70 | 14.47 | 263.10 | 84116.2 | 60.76 | 11.07 | 333.49 |
| $^3H$ | NCM | 85521.5 | 61.77 | 13.47 | 283.26 | 84200.9 | 60.82 | 5.98 | 618.57 |
| $^3H$ | HIGH SENS | 85051.1 | 61.45 | 8.14 | 463.89 | 83426.2 | 60.2 | 4.02 | 901.5 |
| $^3H$ | LLCM | 75422.6 | 54.33 | 5.03 | 586.83 | 72729.0 | 52.39 | 2.44 | 1124.88 |
| $^{14}C$ | ROM OUT | 64052.7 | 68.21 | 4.40 | 1057.41 | 64006.3 | 68.16 | 9.11 | 509.97 |
| $^{14}C$ | NCM | 64069.5 | 68.23 | 4.38 | 1062.86 | 64068.0 | 68.23 | 7.19 | 647.47 |
| $^{14}C$ | HI SENS | 63348.5 | 67.46 | 2.53 | 1798.76 | 62488.8 | 66.5 | 1.51 | 2928.64 |
| $^{14}C$ | LLCM | 48278.6 | 51.41 | 1.31 | 2017.55 | 44945.2 | 47.86 | 0.81 | 2827.88 |

The data in the above table shows that $E^2/B$ was increased significantly by the addition of the pyrene-DPA-vinyl toluene guard shield in every counting mode for $^3H$, and in the "high sensitivity" and "low level" counting modes for $^{14}C$.

In a second series of tests, the $^3H$ sample was a 5-ml. cocktail of benzene containing PPO and POPOP at concentration levels of 6 grams/liter and 0.4 grams/liter, respectively, and tritiated benzene of 140,000 DPM. The $^{14}C$ sample was a 5-ml. cocktail of benzene containing PPO and POPOP at concentration levels of 6 grams/liter and 0.4 gram/liter, respectively, an carbon-14 benzene of 70,000 DPM.

The results of the tests are set forth in the following table:

| SAMPLE | MODE | WITHOUT VIAL HOLDER | | | | WITH VIAL HOLDER | | | |
|---|---|---|---|---|---|---|---|---|---|
| | | CPM | Efficiency % | BKG CPM | $E^2/B$ | CPM | Efficiency % | BKG CPM | $E^2/B$ |
| $^3H$ | ROM OUT | 79651.1 | 57.24 | 15.24 | 214.99 | 78258.4 | 56.23 | 9.15 | 345.55 |
| $^3H$ | NCM | 79819.4 | 57.35 | 15.43 | 213.16 | 77939.4 | 56.00 | 5.99 | 523.54 |
| $^3H$ | HIGH SENS | 79332.0 | 56.77 | 8.54 | 377.38 | 77012.8 | 55.3 | 3.90 | 784.13 |
| $^3H$ | LLCM | 68427.2 | 49.03 | 5.02 | 478.87 | 66674.0 | 47.78 | 2.17 | 1052.04 |
| $^{14}C$ | ROM OUT | 49974.9 | 68.45 | 4.51 | 1038.89 | 49446.0 | 67.73 | 8.45 | 542.88 |
| $^{14}C$ | NCM | 49945.6 | 68.41 | 4.36 | 1073.38 | 49595.5 | 67.93 | 6.63 | 696.0 |
| $^{14}C$ | HI SENS | 49758.5 | 68.16 | 2.29 | 2028.73 | 49873.5 | 68.3 | 1.19 | 3920.08 |
| $^{14}C$ | LLCM | 39942.4 | 54.71 | 1.07 | 2797.37 | 39090.8 | 53.54 | 0.64 | 4478.96 |

The data in the above table shows that $E^2/B$ was increased significantly by the addition of the pyrene-DPA-vinyl toluene guard shield in every counting mode for $^3H$, and in the "high sensitivity" and "low level" counting modes for $^{14}C$.

The above-described system can easily be adapted to measure the presence of gamma radiation. For instance, the measurement system can be conveniently modified to count only those optical event pulses which are followed by pulse bursts of at least a selected number and which are produced as a result of radiation from a sample emitting radioactivity of the gamma type striking the auxiliary scintillator material in the embodiments described above. As is apparent, such event pulses, which are easily detected by the measurement system because the corresponding pulse bursts produced by the solid scintillator material of the active guard shield are characteristically spread over an interval of several microseconds, provide an accurate indication of existing gamma radioactivity. In such an application, no liquid scintlllator or associated quartz sleeve is required since the gamma radiation excites the solid scintillator material directly in order to produce the optical event pulses having characteristic pulse bursts. In this case, the guard shield made of the solid scintillator material essentially behaves as a crystal detector responsive to the gamma radiation being measured. The thickness of the solid scintillator vial has to be increased so as to be sufficient to accommodate the relatively high energy photon bursts generated by the gamma radiation. The system is thus conveniently adaptable for use with samples emitting either beta or gamma radiation.

As is apparent from the foregoing description the system of this invention provides significantly improved accuracy of measurement of low level liquid scintillation by providing improved discrimination between scintillations caused by true sample radioactivity and those produced as a result of internal as well as external background activity. The system is extremely simple, versatile, and convenient to use and does not require the additional expense, complexity and inconvenience of bulky external guard shielding arrangements, along with the additional detectors and anti-coincidence detection systems associated with such shields.

We claim:

1. A low-level liquid scintillation measurement system for counting sample optical events resulting from the radioactive decay of a constituent of a sample to be measured while reducing the counting of background optical events which are optical events produced by background radiation and which create electrical pulses other than pulses representing a sample optical event, said system comprising:

a plurality of detection means located adjacent the sample for detecting optical events and for converting optical events into electrical pulses, coincidence sensing means for receiving said electrical pulses from said plurality of detection means and producing a trigger pulse when said electrical pulses from said plurality of detection means coincide with each other, burst detection means for receiving said trigger pulses from said coincidence sensing means and said electrical pulses from said plurality of detection means for determining the number of electrical pulses present in a selected interval following each of said trigger pulses, evaluation means connected to the burst detection means for determining, in response to the number of pulses detected in said selected interval, the extent to which the optical event represented by the corresponding trigger pulse should be treated as a sample optical event or a background event, and an active guard shield arrangement comprising an auxiliary scintillator optically coupled to said plurality of detection means, said shield being adapted to be excited by background radiation and to effectively increase the number of electrical pulses present in said selected interval following a trigger pulse generated as a result of said coincident pulses produced due to the background radiation, so as to allow said measurement system to accurately evaluate the number of pulses detected in the selected interval and determine the extent to which a trigger pulse is to be treated as a sample optical event.

2. The measurement system of claim 1 wherein said sample is contained in a vial composed of a low-scintillation material and the guard shield arrangement includes a solid auxiliary scintillator surrounding said vial, said solid scintillator, said vial and said detection means being contained in a light tight housing, an optical coupling medium disposed between said solid auxiliary scintillator and said detection means, a transparent sleeve surrounding said vial and functioning to allow optical coupling to said detection means, and a reflective coating provided on the outer surface of said solid scintillator to contain scintillations within the housing.

3. The measurement system of claim 2 wherein said solid auxiliary scintillator is capable of transmitting a substantial portion of light from said sample to said plurality of detection means, is easily excited by background radiation, and produces said increased number of electrical pulses following a trigger pulse generated as a result of coincident pulses produced due to the background radiation.

4. The measurement system of claim 3, wherein said solid auxiliary scintillator is formed by bonding together a pair of segments of solid scintillator with a reflective coating provided at the bonding interface so as to prevent transmission of light from one segment to the other.

5. The measurement system of claim 1 wherein said auxiliary scintillator produces optical events for a substantially longer period of time than the liquid scintillator containing the sample so that background-initiated optical events can be distinguished from sample-initiated optical events.

6. The measurement system of claim 1 which includes means for isolating said auxiliary scintillator from radiation originating from said sample.

7. The measurement system of claim 1 wherein said auxiliary scintillator has a main-component decay constant of at least about 250 nanoseconds.

8. The measurement system of claim 1 wherein said auxiliary scintillator has a main-component decay constant substantially greater than the main-component decay constant of said liquid scintillator.

9. The measurement system of claim 1 wherein said guard shield arrangement is in the form of a vial constructed of a high-scintillation solid auxiliary scintillator for containing the liquid sample, said vial having its inner surface coated with an optically transparent electron impermissive layer that prevents radiation emitted by said liquid from reaching the solid scintillator.

10. The measurement system of claim 9 wherein said solid scintillator is capable of transmitting a portion of light from said sample to said plurality of detection means, is easily excited by background radiation, and produces said increased number of electrical pulses following a trigger pulse generated as a result of coincident pulses produced due to the background radiation.

11. The measurement system of claim 1 wherein said guard shield arrangement is in the form of a vial constructed of a low-scintillation material for containing the liquid scintillation sample, and said sample includes particles of a high-scintillation solid auxiliary scintillator, suspended within it, said particles being externally coated with an optically transparent electron impermissive layer that prevents radiation emitted by said liquid sample from reaching the solid scintillates.

12. The measurement system of claim 11 wherein said solid scintillate material is easily excited by background radiation and produces said increased number of electrical pulses following a trigger pulse generated as a result of 5 coincident pulses produced due to the background radiation.

13. The measurement system of claim 11 wherein said particles are in the form of beads of said solid scintillator scintillator suspended within the liquid scintillation sample.

14. The counting system of claim 1 wherein said auxiliary scintillator has a main-component decay constant shorter than said selected interval.

15. An low-level liquid scintillation counting system using light detection means to determine a characteristic of a sample containing a radionuclide which decays and interacts with a scintillator to provide a sample optical event and which is subject to background radiation not originating from the sample which may reduce the reliability of the results of said counting system, said counting system including:
at least two light detection means located adjacent the sample and serving to detect a sample optical event and convert that event to an electrical pulse representative of the energy level of the event,
coincidence detection means connected to the light detection means for determining the presence of a coincident event pulse based on the substantially simultaneous receipt of electrical pulses from each of the light detection means and producing a trigger pulse when a coincident pulse is present,
burst detection means connected to the light detection means and the coincidence detection means for determining the number of pulses received from the light detection means during a selected interval following each of said trigger pulses,
evaluation means connected to the light detection means and the burst detection means for comparing the number detected by the burst detection means and the energy level of the coincident event pulse to a known table to determine the extent to which an event pulse is to be treated as a sample optical event,
means connected to the evaluation means for summing the event pulses counted for a sample wherein each event pulse is weighted based on the determination made by the evaluation means,
an active guard shield arrangement comprising an auxiliary scintillator optically coupled to said plurality of detection means,
said shield being adapted to be excited by the background radiation and to effectively increase the energy level and the number of electrical pulses present in said selected interval following coincident pulses produced due to the background radiation, so as to a low said measurement system to accurately evaluate the number of pulses detected in the selected interval and determine the extent to which a coincident event pulse is to be treated as a sample optical event.

16. The counting system of claim 15 wherein said sample is contained in a vial and the guard shield arrangement includes a solid auxiliary scintillator surrounding said vial, said solid auxiliary scintillator, said vial, and said light detection means being contained in a light-tight housing, an optical coupling medium disposed between said solid auxiliary scintillator and said light detection means, a transparent sleeve surrounding said vial and functioning to allow optical coupling of light from the sample to said light detection means through said solid auxiliary scintillator, and a reflector coating provided on the outer surface of said solid auxiliary scintillator to contain scintillations within the housing.

17. The counting system of claim 16 wherein said solid auxiliary scintillator is capable of transmitting a substantial portion of light from said sample to said plurality of detection means, is easily excited by background radiation, and produces said increased number of electrical pulses following a trigger pulse generated as a result of a coincident event pulse produced due to the background radiation.

18. The counting system of claim 16 wherein said solid auxiliary scintillator is formed by bonding together a pair of segments of solid scintillator with a reflective coating provided at the bonding interface so as to prevent transmission of light from one segment to the other.

19. The counting system of claim 15 wherein said auxiliary scintillator produces optical events for a substantially longer period of time than the liquid scintillator containing the sample so that background-initiated optical events can be distinguished from sample-initiated optical events.

20. The counting system of claim 15 which includes means for isolating said auxiliary scintillator from radiation originating from said sample.

21. The counting system of claim 15 wherein said auxiliary scintillator has a main-component decay constant of at least about 250 nanoseconds.

22. The counting system of claim 15 wherein said auxiliary scintillator has a main-component decay constant substantially greater than the main-component decay constant of said liquid scintillator.

23. The counting system of claim 15 wherein said guard shield arrangement is in the form of a vial constructed of a high-scintillation solid auxiliary scintillator for containing the liquid sample, said vial having its inner surface coated with an optically transparent electron impermissive layer that prevents radiation emitted by said liquid from reaching the solid scintillator.

24. The counting system of claim 22 wherein said solid scintillator material of the vial is capable of transmitting a substantial portion of light from said sample to said plurality of detection means, is easily excited by background radiation, and produces said increased number of electrical pulses following a trigger pulse generated as a result of a coincident event pulse produced due to the background radiation.

25. The counting system of claim 14 wherein said guard shield arrangement is in the form of a vial constructed of a low-scintillation material for containing the liquid scintillation sample, said sample including particles of a high-scintillation solid auxiliary scintillator suspended within it, said particles being coated with an optically transparent electron impermissive layer that prevents radiation emitted by said liquid from reaching the solid scintillator.

26. The counting system of claim 25 wherein said solid scintillation material of the suspended particles is easily excited by background radiation and produces said increased number of electrical pulses following a trigger pulse generated as a result of a coincident event pulse produced due to he background radiation.

27. The counting system of claim 25 wherein said particles are in the form of beads of the solid scintillator material suspended within the liquid scintillation sample.

28. The counting system of claim 15 wherein said auxiliary scintillator has a main-component decay constant shorter than said selected interval.

29. A low-level liquid scintillation counting method wherein valid sample optical events are detected and converted into electrical pulses and which is subject to other invalid background optical events, said method comprising the steps of:
   detecting optical events,
   converting the optical events into electrical pulses representative of the energy level of the detected event,
   determining that a pulse is likely to be a sample pulse by requiring simultaneous detection of an optical event and conversion of that event into an electrical pulse through two different means,
   enhancing the number and amplitude of electric pulses generated after simultaneous detection of invalid background events,
   counting the number of said enhanced electric pulses received in a selected time interval after the simultaneous detection of an optical event, and
   comparing the number of electric pulses from the step of counting to a preselected number to determine the extent to which said simultaneously detected optical event should be treated as a sample optical event or a background event.

30. The counting method of claim 29 wherein said comparing step also compares the energy level of said electrical pulse to a known table.

31. A liquid scintillation system for counting sample optical events resulting from the radioactive decay of a constituent of a sample to be measured in a liquid scintillator while reducing the counting of background events which are all optical events other than sample optical events and which are electrical pulses other than electrical pulses representing a sample optical event, said system comprising:
   a plurality of detection means located adjacent the sample for detecting optical events and for converting the detected optical events into electrical pulses, said detection means having a known dead time following the detection of an optical event, the detection of a subsequent optical event being inhibited during said dead time,
   coincidence sensing means for receiving said electrical pulses from said plurality of detection means and producing a trigger pulse when said electrical pulses from said plurality of detection means coincide with each other,
   pulse characteristic detection means for receiving said coincidence signals from said coincidence sensing means and said electrical pulses from said plurality of detection means for determining a selected pulse characteristic following each of said trigger pulses,
   signal processing means responsive to said coincidence sensing means and said pulse characteristic detection means for determining, within a coincident-pulse-evaluation interval, the extent to which the optical event represented by said trigger pulse should be treated as a sample optical event, and
   an auxiliary scintillator for producing auxiliary optical events in response to background radiation, said auxiliary scintillator being located where said auxiliary optical events can be detected by said detection means, and having
   (i) a main-component decay constant substantially longer than said dead time of said detection means and
   (ii) an afterglow that diminishes to a statistically insignificant level within said coincident-pulse-evaluation interval.

32. The counting system of claim 31 wherein said auxiliary scintillator has a main-component decay constant of at least about 250 nanoseconds.

33. The counting system of claim 31 wherein said auxiliary scintillator has a main-component decay constant substantially greater than the main-component decay constant of said liquid scintillator.

34. The counting system of claim 31 wherein said auxiliary scintillator is disposed around the sample to be measured so that the auxiliary scintillator is exposed to the same background radiation as the sample.

35. The counting system of claim 31 wherein said auxiliary scintillator is isolated from the radiation from said sample so that the auxiliary scintillator produces optical events only in response to background radiation.

36. The counting system of claim 31 wherein said auxiliary scintillator produces optical events for at least about 25 nanoseconds following each background radiation event to which said auxiliary scintillator is exposed.

37. The counting system of claim 31 wherein said auxiliary scintillator comprises pyrene.

38. The counting system of claim 31 wherein said auxiliary scintillator comprises at least one polymer selected from the group consisting of naphthalene, phenanthrene, anthracene, pyrene, carbazole, azulene, chrysene, perylene, 2-ethyl anthracene, and 2-ethylnaphthalene.

39. The counting system of claim 31 wherein said auxiliary scintillator comprises a solid polymer including a primary fluor and a wave shifter.

40. The counting system of claim 31 wherein said auxiliary scintillator forms a vial for containing said sample, including said liquid scintillator.

41. The counting system of claim 31 wherein said auxiliary scintillator is disposed around said detection means so that the auxiliary scintillator is exposed to the same background radiation as said detection means.

42. The counting system of claim 31 wherein said auxiliary scintillator is in the form of solid pellets disposed in said sample.

43. The counting system of claim 31 wherein said auxiliary scintillator forms a sample cavity for receiving a vial containing the sample to be measured.

* * * * *